(12) United States Patent
Deshmukh et al.

(10) Patent No.: US 12,414,019 B2
(45) Date of Patent: Sep. 9, 2025

(54) SENSOR-BASED ROAMING ISSUE IDENTIFICATION IN A WIRELESS NETWORK

(71) Applicant: Hewlett Packard Enterprise Development LP, Houston, TX (US)

(72) Inventors: Amogh Guruprasad Deshmukh, San Jose, CA (US); Mohd Shahnawaz Siraj, San Jose, CA (US); Eldad Perahia, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 508 days.

(21) Appl. No.: 17/808,397

(22) Filed: Jun. 23, 2022

(65) Prior Publication Data
US 2023/0422118 A1    Dec. 28, 2023

(51) Int. Cl.
*H04W 36/00* (2009.01)
*H04W 36/08* (2009.01)
*H04W 84/12* (2009.01)

(52) U.S. Cl.
CPC . *H04W 36/00833* (2023.05); *H04W 36/0079* (2018.08); *H04W 36/08* (2013.01); *H04W 84/12* (2013.01)

(58) Field of Classification Search
CPC ....... H04W 36/00833; H04W 36/0079; H04W 36/08; H04W 84/12; H04W 4/38;
(Continued)

(56) References Cited

U.S. PATENT DOCUMENTS

| 11,153,152 B2 | 10/2021 | Siddiqi et al. |
| 2007/0064655 A1* | 3/2007 | Ruuska ................. H04W 28/18 370/332 |

(Continued)

FOREIGN PATENT DOCUMENTS

| AU | 2017254525 A1 | 10/2018 | |
| CA | 2880984 A1 * | 2/2014 | ............ H04W 48/16 |

(Continued)

OTHER PUBLICATIONS

Cisco, "Wireless Sniffing using Cisco Lightweight Access Point (LAP) in Sniff er mode", available online at <https://www.cisco.com/c/en/us/support/docs/wireless-mobility/80211/200527-Fundamentals-of-802-11-Wireless-Sniffing.html#anc12>, Jul. 16, 2021, pp. 1-72.

(Continued)

*Primary Examiner* — Charles N Appiah
*Assistant Examiner* — Frank E Donado
(74) *Attorney, Agent, or Firm* — Hewlett Packard Enterprise Patent Department

(57) ABSTRACT

Examples of sensor-based roaming issue identification in a wireless network are disclosed. In an example, a wireless roam for a sensor may be initiated from a source AP to a target AP. Management traffic between the sensor and one of the source AP or the target AP during the wireless roam may be monitored. In response to detecting an anomaly in the management traffic, the wireless roam for the sensor from the source AP to the target AP may be re-initiated. Management traffic capture on the sensor during the reinitiated wireless roam may be initiated. A roaming issue for the sensor may be identified based on analysis of the captured management traffic and the same may be reported.

17 Claims, 6 Drawing Sheets

(58) Field of Classification Search
CPC ....... H04W 4/70; H04W 24/04; H04W 24/08; H04W 24/10; H04W 84/18
See application file for complete search history.

(56) References Cited

U.S. PATENT DOCUMENTS

| | | | |
|---|---|---|---|
| 2014/0242985 A1* | 8/2014 | Kneckt | H04W 40/14 |
| | | | 455/434 |
| 2018/0338278 A1* | 11/2018 | Ketonen | H04W 48/20 |
| 2020/0162315 A1 | 5/2020 | Siddiqi et al. | |

FOREIGN PATENT DOCUMENTS

| | | |
|---|---|---|
| CN | 109041107 A | 12/2018 |
| WO | WO-2018217310 A1 * | 11/2018 |

OTHER PUBLICATIONS

Kiviniemi et al., "Wireless Packet Captures—Troubleshooting when All Else Fails", available online at <https://www.mist.com/wireless-packet-captures-troubleshooting-else-fails/>, Jan. 3, 2020, 6 pages.

Netscout, "AirMagnet Enterprise", DataSheet, Sep. 11, 2017, pp. 1-12.

Hewlett Packard Enterprise, "Aruba Network Management Plugin," User Guide, Network Management Plugin v1.0, Oct. 18, 2021, 32 pages.

\* cited by examiner

SENSOR-BASED ROAMING ISSUE IDENTIFICATION IN A WIRELESS NETWORK

BACKGROUND

Deployment of multiple access point (APs) in a facility is important to provide network coverage to wireless client devices in the facility. When a wireless client moves around in the facility, it may connect to different APs in the facility. A wireless client may roam from one AP to another to have uninterrupted network access.

When moving, a wireless client may disassociate from one AP and reassociate with another AP to maintain network connectivity. In order to allow uninterrupted network access, the process of roaming from one AP to another is significant. In some scenarios, client and AP capabilities or other network conditions may not allow for a smooth transition of the client from one AP to another which may give rise to errors when a client tries to roam from one AP to another. This may adversely affect network performance during roaming.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
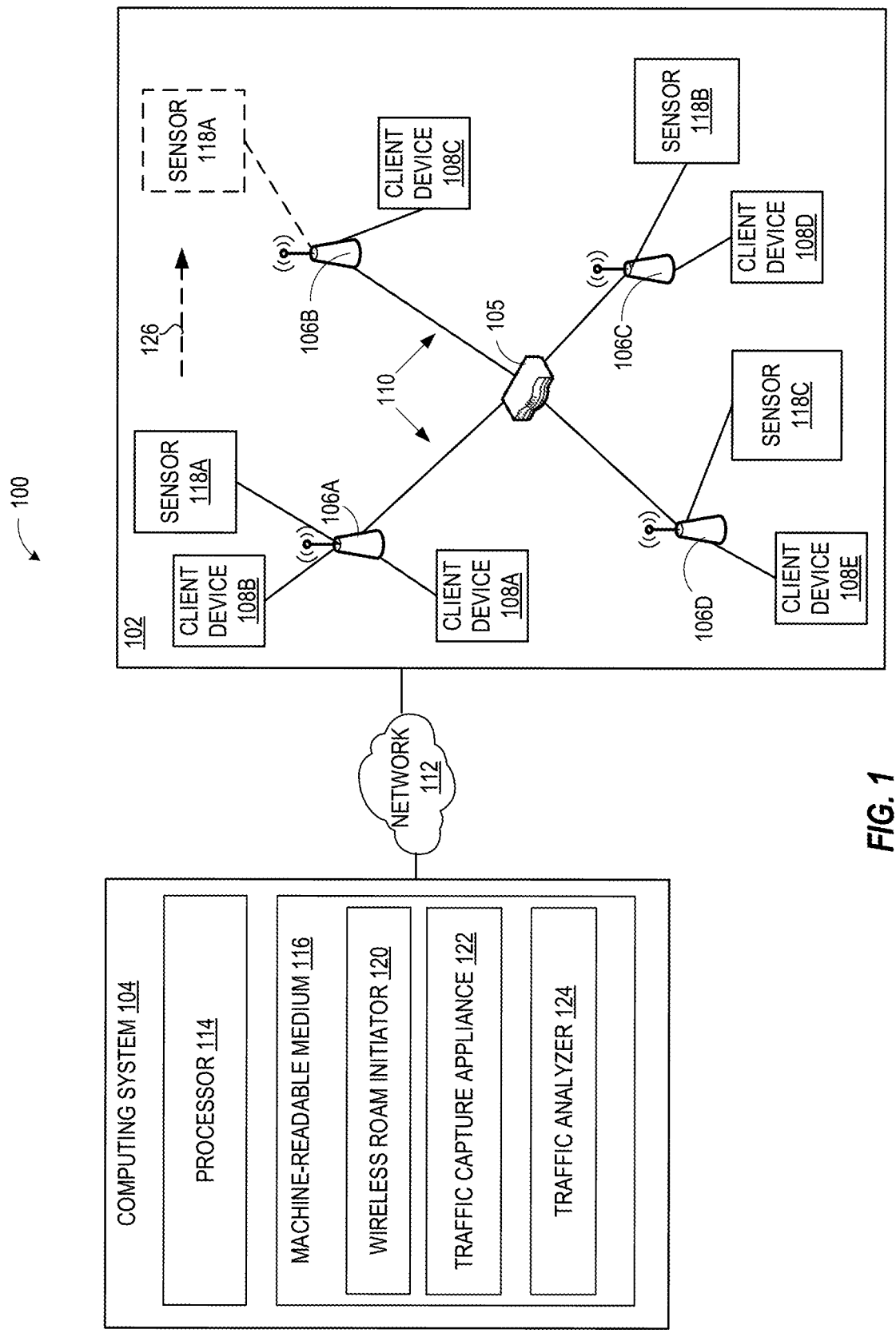
FIG. 1 illustrates a network environment in which various of the examples presented herein may be implemented.

Some wireless local area networks (WLANs) include sensors that aid in monitoring and analyzing network performance in a WLAN. These sensors may exchange data with different devices in the WLAN to analyze network performance. Such sensors may be deployed at various locations (e.g., different floors of the building, different offices, etc.) within a WLAN and are programmed to run various tests to evaluate network connectivity and services running in the WLAN. Wireless access points (APs) act as points of access in WLANs. These sensors may function as non-AP stations (STAs) associating with the APs in the WLAN and may run different applications and services to test network performance.

The sensors may be configured to operate and may be managed by a network insight system that may be cloud-based. The sensors may establish wireless connections to/from the network insight system. That is, the network insight system may be a "backend" system which provides a dashboard that may be a "frontend" system. The network insight system may communicate with remotely located sensors to send sensor configuration information or other data associated with or controlling operation of the sensors. The network insight system may also receive information or data collected by the sensors and analyze the same regarding one or more aspects of a network in which the sensors have been installed as a result of the sensors monitoring or testing aspects of the network, applications running on the network, etc. A network administrator may then view or obtain such information or data via the dashboard for debugging network issues. Operating parameters or information regarding configuration of the sensors may be set forth using the dashboard.

A Wi-Fi client may move about in different locations of a wireless network. The wireless network may include an Extended Service Set (ESS) which refers to a wireless network, created by multiple APs, which appears to users as a single, seamless network, such as a network covering a home or office. When a Wi-Fi client associated with one AP moves or transitions to another AP in the ESS, it may be said to "roam". In some scenarios, the Wi-Fi clients roaming from one AP to another in the ESS may be subject to roaming issues. A roaming issue refers to a fault, error or glitch that may occur when a Wi-Fi client initiates a roam from one AP to another AP in the ESS resulting in degraded network performance, such as high latency, traffic drops, low data rates, etc. The roaming issue may arise due to failure in one or more functionalities in an AP or the Wi-Fi client. When a roaming issue arises, a network administrator needs to debug and spend man-hours and resources to identify the roaming issue and optimize the network configuration to address the same.

Frequent roaming issues may cause service interruptions leading to poor Quality of Experience (QoE). Generally, a packet capture device, such as a sniffer may be deployed to collect over the air packets which may be analyzed to identify roaming issues. However, for analyzing network performance for a client roaming between any two APs in the ESS, a sniffer may be needed for each AP in the ESS, which is not feasible. In addition to that, enterprise WLAN deployments may have security settings enabled (e.g., Enterprise SSID-802.1x), which may prevent packet decryption and analysis using a sniffer due to security reasons. Further, the sensors operating as wireless clients may have the capability of saving a packet capture and analyzing the same to determine network performance. However, such sensors do not save packet captures during roaming and thus identifying roaming issues based on analysis of such packet captures may be cumbersome and error prone. Additionally, analyzing such packet captures for identifying a roaming issue is an indirect or passive approach, since real-time packets that originate during roaming of a client is not captured for such analysis. Thus, identification of roaming issues based on such packet captures may be inaccurate.

The present techniques allow for wireless roaming of a sensor from a source AP to a target AP. During the wireless roam, a computing system (such as a backend network insight system) monitors management traffic between the sensor and the source AP or the target AP. On detection of an anomaly in the management traffic, a wireless roam may be re-initiated and a traffic capture may be initiated at the sensor during the reinitiated wireless roam. The computing system may analyze the traffic captured during the reinitiated wireless roam to identify a roaming issue and may report the roaming issue for troubleshooting. Thus, a roaming issue may be identified by analyzing real-time management traffic captured during a wireless roam of the sensor for testing the roaming performance of the network. Since, real time traffic captures are used for the analysis, the identification of roaming issues may be more accurate. Further, in the present techniques, traffic capture is conditionally initiated at the sensor on occurrence of an anomaly in management traffic exchange during the wireless roam. Thus, a traffic capture appliance (or sniffer) is not required to be executed at all times during the wireless roam. On detection of the anomaly traffic capture may be initiated. This may allow to optimally use traffic capture on the sensors and thereby may help in managing storage and analysis of the captured traffic. Further, since a sensor can be tuned to capture over the air traffic in any operating channel of an AP associated with the wireless roam, a traffic capture appliance (or sniffer) per AP may not be required, which may save implementation cost and manual effort.

The following detailed description refers to the accompanying drawings. Wherever possible, the same reference numbers are used in the drawings and the following description to refer to the same or similar parts. While several embodiments of the present invention are described herein, modifications, adaptations, and other implementations of those embodiments are possible. Accordingly, the following detailed description does not limit the scope of the present invention. Instead, the proper scope of the present invention is defined by the appended claims.

Before describing examples of the disclosed systems and methods in detail, it may be useful to describe an example network installation with which these systems and methods might be implemented in various applications. FIG. 1 illustrates a network environment 100 in which various of the examples presented herein may be implemented. The network environment 100 may include a primary network 102, one or more secondary networks (not shown), and a computing system 104 that aids in monitoring network performance in the primary network 102. The computing system 104 may be hosted on a network outside the primary network 102 or within the primary network 102. In some examples, the computing system 104 may be deployed on a cloud platform hosted on a public, private, or hybrid cloud outside the primary network 102.

The primary network 102 may include a network of devices implemented for an organization, such as a business, educational institution, governmental entity, healthcare facility, or home network. This diagram illustrates an example primary network implemented for an organization having multiple users and possibly one or more physical or geographical sites. The primary network 102 may be a private network, such as a network that may include security and access controls to restrict access to authorized users of the private network. For example, the authorized users may include employees of a company, residents of a house, customers at a business, and so on.

In the illustrated example, the primary network 102 is shown to include a controller 105. A single controller 105 is illustrated, though the primary network 102 may include multiple controllers. In some examples, the controller 105 may communicate with other networks through a router. In other implementations, the controller 105 may provide router functionality to the devices in the primary network 102. The controller 105 may be operable to configure and/or manage switches, routers, APs, and/or client devices in the primary network 102. The controller 105 may itself be, or provide the functionality of, an AP.

In some examples, the controller 105 may be in communication with one or more switches and/or wireless APs 106A-106D. The APs 106A-106D may provide network connectivity to various client devices 108A-108E. One or more of the AP 106A-106C and one or more of the client devices 108A-108E may access network resources, including other devices on the primary network 102. Examples of client devices 108A-108E may include, but are not limited to, desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, IOT devices, and the like.

The wireless APs 106A-106D are included as an example of a point of access to the primary network 102 for client devices 108A-108E. Each of APs 106A-106D may be a combination of hardware, software, and/or firmware that is configured to provide wireless network connectivity to wireless client devices 108A-108E. In the illustrated example, the APs 106A-106D can be managed and configured by the controller 105. The APs 106A-106D may communicate with the controller 105 over connections 110, which may be either wired or wireless interfaces.

Further, the primary network 102 may host one or more sensors 118A-C. Each of the sensors 118A-C may be within a range of one or more APs 106A-106D in the primary network 102. A sensor may associate with an AP in the primary network 102 via a wired or a wireless connection. Thus, sensor 118A is associated with AP 106A, sensor 118B is associated with AP 106C, and sensor 118C is associated with AP 106D. The number of sensors deployed in the primary network 102 may depend on the number of APs in the primary network 102. For example, in one implementation such as an office set-up, one sensor may be deployed for every five APs. In another example implementation such as a retail store, one sensor may be deployed in one site. In yet another example implementation such as a large public venue (e.g., a stadium or a conference center) one sensor may be deployed for every ten APs.

The sensors 118A-C may be an example representative of the client devices 108A-108E. In one example, the sensors 118A-C may be a client device that functions in coordination with the computing system 104 to identify roaming issues in the primary network 102 or a portion thereof. In another example, the sensors 118A-C may be a user experience insight sensor that is configured to mimic an end-user behavior by simulating a user and the interactions it would perform with an AP in the network. In yet another example, the sensors 118A-C may be low power devices, IoT devices, or any other software-defined or hardware-based devices capable of collecting and transmitting data. The term "low powered device", as used herein, refers to a device specifically designed for lower power consumption compared to typical servers or network equipment. The term "IoT device", as used herein, refers to a hardware device, an actuator, a gadget, an appliance, or any other machine, that is programmed for a certain application and can transmit data over the internet or other networks to the computing system 104.

Each of the sensors 118A-C may maintain a persistent or a non-persistent connection with the computing system 104. Examples of the connection between the sensors 118A-C and the computing system 104 may include a direct connection, VPN connection, Software-Defined Wide Area Networking (SDWAN) connection, wired connection, wireless connection, or any other suitable connection. Persistent connection, as used herein, refers to a network communication channel that remains open between the sensors 118A-C and the computing system 104. Non-persistent connection, as used herein, refers to network communication that may be interrupted, established on-demand, or otherwise maintained in a non-persistent manner between the sensors 118A-C and the computing system 104.

The computing system 104 may be a computing system that is communicatively coupled to the primary network 102 via the network 112. The computing system 104 may be a computer, a controller, a server, or a storage system hosted on a public cloud, a private cloud, or a hybrid cloud. In certain examples, the computing system 104 may be any suitable device having a hardware processor 114, such as one or more central processing units (CPUs), semiconductor-based microprocessors, and/or other hardware devices suitable for retrieval and execution of instructions stored in a machine-readable storage medium 116. The processor 114 may fetch, decode, and execute instructions, such as instructions for identifying roaming issues in the primary network 102. In some examples, machine-readable storage media 116 may be a non-transitory storage medium, where the term "non-transitory" does not encompass transitory propagating signals. As described in detail below, machine-readable storage medium 116 may be encoded with executable instructions for identifying roaming issues. The instructions include instructions for wireless roam initiator 120, traffic capture appliance 122, and traffic analyzer 124. In some examples, the computing system 104 may be implemented as a service running on a "cloud computing" environment or as "software as a service" (SaaS).

The computing system 104 may perform various functions to test wireless roaming performance in the primary network 102. The computing system 104 may initiate a wireless roam for the sensor 118A, as indicated by the dotted arrow 126 in FIG. 1. When a Wi-Fi client associated with one AP moves or transitions to another AP in the ESS, it may be said to "roam" between the two APs. During a wireless roam, the Wi-Fi client may disassociate from one AP and reassociate with another AP in the ESS. The AP from which the Wi-Fi client disassociates may be called a source AP and the other AP with which it reassociates may be called a target AP. As mentioned earlier, the sensors 118A-C may mimic the behavior of Wi-Fi clients. In an example, the computing system 104 may initiate a wireless roam for such a sensor automatically at a predefined interval or based on an input from a network administrator.

With reference to FIG. 1, the processor 114 may execute wireless roam initiator 120 stored in the machine-readable storage medium 116 to initiate a wireless roam of the sensor 118A. Consider that the sensor 118A is associated with the AP 106A and the computing system 104 initiates the wireless roam from AP 106A to AP 106B. Thus, AP 106A is the source AP and the AP 106B is the target AP. In an example, the wireless roam initiator 120 may trigger the sensor 118A to lower its transmit power below a threshold. In response to the transmit power being lowered, the source AP 106A may send a Basic Service Set (BSS) transition management (BTM) request to the sensor 118A according to Institute of Electrical and Electronics Engineers (IEEE) 802.11v. IEEE 802.11v refers to a standard for Wireless Network Management (WNM) according to which APs and wireless clients can exchange information with each other in order to improve their performance. BTM request is a suggestion of available APs to which a Wi-Fi client may transition from a given AP. The Wi-Fi client can make its own decision whether to follow the suggestion or not. In another example, the wireless roam initiator 120 may trigger the sensor 118A to send a BTM query to the source AP 106A. The BTM query may refer to a message sent by a Wi-Fi client to an AP with which it is currently associated requesting for a BTM request message from the AP. In another example, the wireless roam initiator 120 may trigger the source AP 106A to send an unsolicited BTM request to the sensor 118A.

In an example, the BTM request may comprise a list of BSS transition candidates. In an example, the list of BSS transition candidates may contain one or more Neighbor Report elements describing the preferences for target BSS candidates or target APs. The BTM request may include a preference field value used to establish the relative order of preference of the target APs within the given list. With reference to FIG. 1, the target AP 106B may be included in a list of BSS transition candidates sent by the AP 106A in the BTM request. The processor 114 may execute wireless roam initiator 120 to cause the sensor 118A to send a BTM response to the source AP 106A accepting a transition to the target AP 106B. The BTM response may include the result of the sensor 118A's BSS transition decision in a target BSSID field and a status code field in the BTM response. For example, the target BSSID field may include the BSSID of the target AP 106B and the status code field may be set to a value of 0 (i.e., Accept) indicating that the sensor 118A will transition from the source AP 106A to the target AP 106B indicated in the target BSSID field. In response to the sensor 118A sending the BTM response, the transition of the sensor 118A from source AP 106A to target AP 106B may be initiated.

In another example, the processor 114 may execute the wireless roam initiator 120 to initiate a scan by the sensor 118A. The sensor 118A may scan the network to identify the list of BSS transition candidates. In an example, the sensor 118A may identify the list of BSS transition candidates based on neighbor reports from the AP 106A according to IEEE 802.11k. The IEEE 802.11k amendment, also called Radio Resource Measurement (RRM) allows stations to inform each other about their respective radio frequency (RF) environments. With IEEE 802.11k, a Wi-Fi client may request an AP to send a Neighbor Report. Thus, the sensor 118A may also send a request for neighbor report to the source AP 106A to which the source AP 106A may respond with a neighbor report. The neighbor report may include the target AP 106B. The processor 114 may execute wireless roam initiator 120 to cause the sensor 118A to send a BTM response to the source AP 106A accepting a transition to the target AP 106B thereby initiating the wireless roam.

During the wireless roam, the processor 114 may execute traffic capture appliance 122 stored in the machine-readable storage medium 116 to monitor management traffic between the sensor 118A and the source AP 106A or the target AP 106B. Management traffic may refer to data exchanged during roaming between a Wi-Fi client and a source AP and/or target AP between which it roams. The management traffic may include neighbor devices information, security information, and association/disassociation information. When a Wi-Fi client sends a BTM response to a target AP mentioned in the response, the Wi-Fi client and the target AP may exchange reauthentication messages and reassociation messages. Further, depending on the security settings associated with the target AP, the Wi-Fi client may further undertake exchange of security related messages. For example, if the Wi-Fi client has IEEE 802.1x SSID enabled, the Wi-Fi client and the target AP establishes a master key to begin 802.1x Extensible Authentication Protocol (EAP) authentication. Subsequently, in an example, the Wi-Fi client and the target AP may initiate a 4-way handshake. During the 4-way handshake, the Wi-Fi client and the target AP may derive their Pairwise Transient Key (PTK) which is a unique encryption key for their association, derived from the master key. With reference to FIG. 1, the management traffic exchanged between the sensor 118A and the source AP 106A and the target AP 106B may include neighbor reports received by the sensor 118A from the source AP 106A, BTM response from the sensor 118A to the source AP 106A, reauthentication and reassociation messages exchanged between the sensor 118A and the target AP 106B, security related messages and 4-way handshake messages exchanged between the sensor 118A and the target AP 106B. The processor 114 may execute the traffic analyzer 124 to monitor power levels, data rates, and timing of the management traffic exchanged between the sensor 118 and the source AP 106A or the target AP 106B.

Further, the processor 114 may execute the traffic analyzer 124 to detect an anomaly in the management traffic. An anomaly in the management traffic may refer to a deviation from an expected or predefined management traffic exchange that is to occur between the sensor 118A and the source AP 106A or the target AP 106B during a roam. For example, if any of the BSS Transition Management query, request, or response messages exchanged between the sensor 118A and the source AP 106A are dropped or received after an undesirable time delay, reauthentication and reassociation messages exchanged between the sensor 118A and the target AP 106B is dropped, 4-way handshake messages are not exchanged, etc., the traffic analyzer 124 may detect an anomaly in the management traffic. In an example, non-receipt of a response to a neighbor report request sent by the sensor 118A to the source AP 106A may also be considered an anomaly by the traffic analyzer 124.

In another example, the traffic analyzer 124 may monitor traffic loss, latency, and roam time. Traffic loss may refer to a difference of a number of packets transmitted by a sender to a number of packets received by a receiver. Thus, the traffic loss may refer to number of packets lost or dropped during transmission. Latency refers to the time it takes for data to be transferred between its original source and its destination. Roam time may refer to the total time taken by a Wi-Fi client from the transition being initiated to completion of the transition from a source AP to a target AP. In an example, threshold values of traffic loss, latency, and roam time may be stored in the computing system 104.

The threshold values of traffic loss, latency, and roam time may depend on network conditions and AP capabilities. For example, threshold values of roam time may be different for different wireless security configurations. In an example, IEEE 802.1x authentication times will be different with or without IEEE 802.11r fast roaming. IEEE 802.1x is an IEEE Standard for Port-Based Network Access Control (PNAC), providing protected authentication for secure network access by use of an authentication server, such as a Remote Authentication Dial-In User Service (RADIUS) server. IEEE 802.11r is a standard to allow continuous connectivity to wireless devices in motion, with fast and secure client transitions from one AP to another AP in an ESS. With fast roaming, the threshold for roam time may be lesser than that without fast roaming.

The traffic analyzer 124 may measure the traffic loss, latency, and roam time during a transition of the sensor 118A form the source AP 106A to the target AP 106B and compare them with their threshold values. The traffic analyzer 124 may identify an anomaly in case the measured values deviate from the threshold values. In response to detecting an anomaly in the management traffic, the processor 114 may execute the wireless roam initiator 120 stored in the machine-readable storage medium 116 to reinitiate a wireless roam of the sensor 118A from AP 106A to AP 106B. The wireless roam may be reinitiated based on similar conditions as that of the previous wireless roam of the sensor 118A from the source AP 106A to the target AP 106B. In an example, the wireless roam may be initiated using similar methods as described above.

During the reinitiated wireless roam, the processor 114 may execute the traffic capture appliance 122 stored in the machine-readable storage medium 116 to initiate management traffic capture on the sensor 118A. In an example, the traffic capture appliance 122 may cause the sensor 118A to intercept and log the management traffic that is exchanged between the sensor 118A and the source AP 106A or the target AP 106B. In an example, capturing the management traffic refers to the process of intercepting and logging time, power levels, and data rates of different management frames. As data streams flow across the network, the traffic capture appliance 122 may cause the sensor 118A to capture each packet and, in some examples, decode the packet's raw data, showing the values of various fields in the packet.

Further, the processor 114 may execute traffic analyzer 124 stored in the machine-readable storage medium 116 to identify a roaming issue for the sensor 118A based on analysis of the captured management traffic. A roaming issue may refer to unexpected behavior of one or more APs or non-AP STAs in a Wi-Fi network that may lead to a degraded network performance during a roam of a non-AP STA in the Wi-Fi network. In an example, the traffic analyzer 124 may identify a roaming issue with the sensor 118A roaming from the source AP 106A to the target AP 106B based on analysis of the management traffic captured. In an example, a set of metrics indicative of roaming performance may be identified from the management traffic and compared with a network performance baseline to identify the roaming issue. The network performance baseline may include a set of metrics used in network performance monitoring to define the normal working conditions of an enterprise network infrastructure during roaming.

On a roaming issue being identified, the computing system 104 may report the roaming issue via a dashboard (not shown) coupled with it. The dashboard may be displayed on a website or an application that is accessible to a network administrator of the primary network 102. In an example, the dashboard represents a front-end interface of the computing system 104. In some examples, the computing system 104 may also send a notification to the network administrator when the roaming issue is identified. Also, in some examples, the computing system 104 may recommend, via the notification, a corrective action to resolve the roaming issue. The corrective action may include one or more of a firmware update, a software update, and/or a configuration change for the STAs subject to the roaming issue. Upon implementing the corrective action, the roaming issue may be considered to be resolved.

Figure 2A:
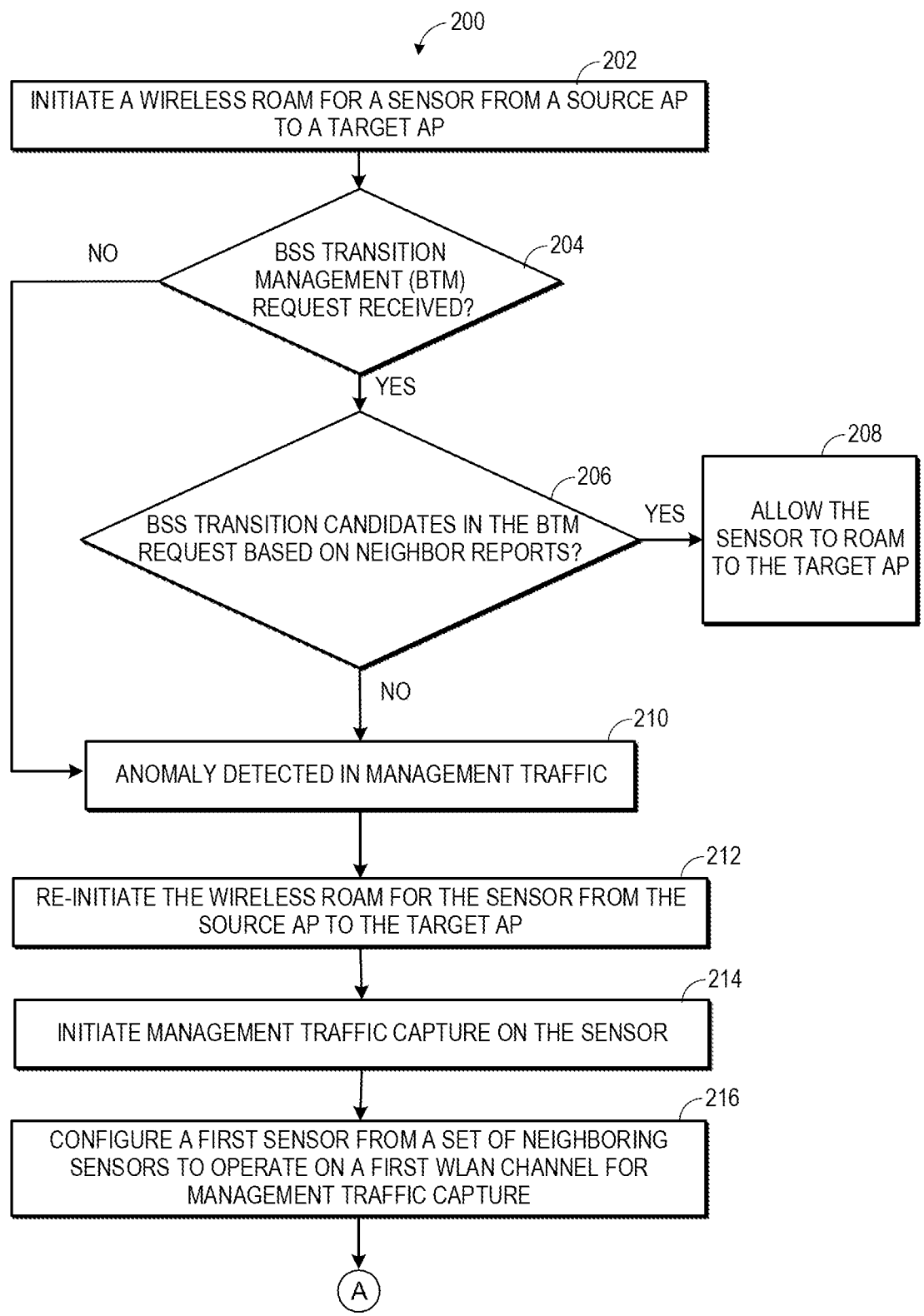
FIGS. 2A and 2B illustrate a flowchart of an example method for identification of roaming issues in a network.
Figure 2B:
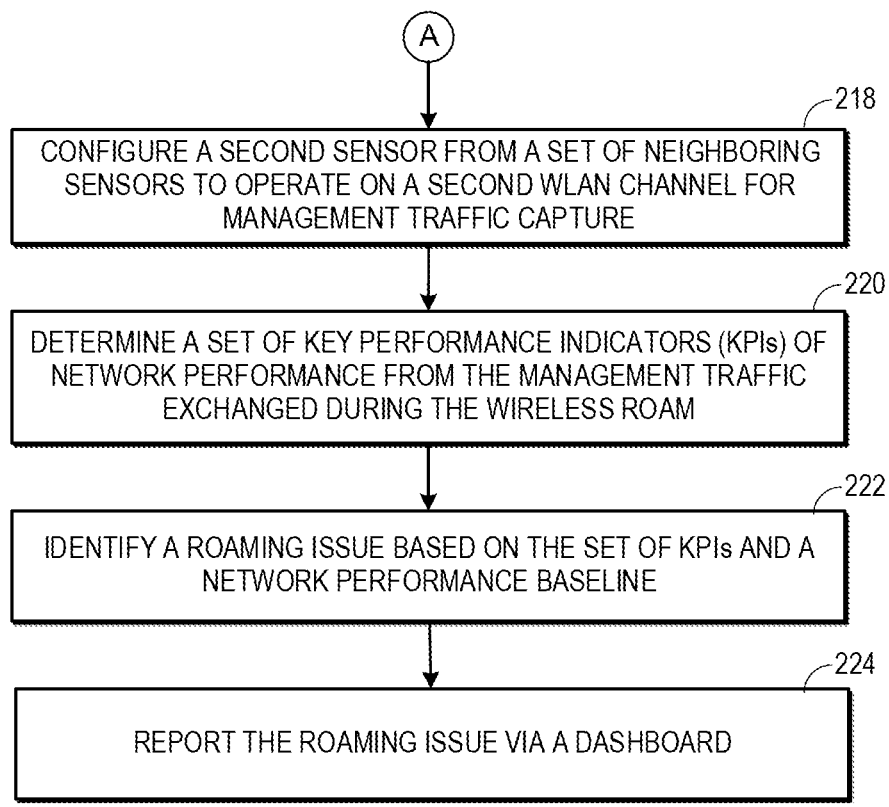

FIGS. 2A and 2B show flowcharts to illustrate a method 200 for roaming issue identification in a network, according to an embodiment of the present invention. The network may be a primary network, such as primary network 102 of FIG. 1. In an example, the steps of the method 200 may be performed by a computing system, such as the computing system 104 of FIG. 1.

At block 202, a wireless roam may be initiated for a sensor from a source AP to target AP. The source AP may be the AP with which the sensor is presently associated and the target AP refers to another AP in the ESS. In an example, the computing system may initiate the wireless roam for such a sensor automatically at a predefined interval or based on an input from a network administrator. The initiation of the wireless roam includes triggering exchange of management traffic between the sensor and the source AP or the target AP. In an example, the management traffic may include neighbor reports received by the sensor from the source AP, BTM response from the sensor to the source AP, reauthentication and reassociation messages exchanged between the sensor and the target AP, security related messages and 4-way handshake messages exchanged between the sensor and the target AP.

At block 204, it may be checked whether a BTM request is received by the sensor. In an example, if the BTM request is in response to a BTM query initiated from the sensor by the computing system, the computing system may check for receipt of the BTM request within a predefined time. Further, if the BTM request from the source AP is in response to the transmit power of the AP being lowered by the computing system, the computing system may check for receipt of the BTM request within the predefined time from lowering of the transmit power.

In case the BTM request is not received within the predefined time ("No" branch from block 204), the computing system may detect that there is an anomaly in the management traffic, at block 210. An anomaly in the management traffic may refer to a deviation from an expected or predefined management traffic exchange that is to occur between the sensor and the source AP or the target AP during a wireless roam. Anomaly may include non-receipt of management frames or unexpected time delays in receiving management frames.

In response to receiving the BTM request ("Yes" branch from block 204), it may be verified whether BSS transition candidates in the BTM request is based on neighbor reports at block 206. In an example, the computing system may monitor IEEE 802.11k neighbor reports and the BTM request from the source AP to the sensor. If the Basic Service Set Identifiers (BSSIDs) present in the neighbor reports are also included in the BTM request ("Yes" branch from block 206), the computing system may determine that the BSS transition candidates are based on neighbor reports and may allow the sensor to roam to the target AP, at block 208. The sensor is allowed to roam to the target AP since no anomaly in management traffic is detected which indicates that there may be less chances of a roaming issue. In an example, the sensor may roam to one of the APs mentioned in the BSS transition candidates. After a predefined interval of completion of the roam, the method 200 may be re-initiated for the sensor.

Discrepancies in the candidate APs present in the BSS transition candidates and the neighbor APs in the neighbor report may indicate the possibility of a roaming issue. Thus, in response to a mismatch between the BSSIDs included in the BSS transition candidates in the BTM request and the BSSIDs in neighbor reports ("No" branch from block 206), an anomaly in management traffic is detected, at block 210. Although in the method 200, discrepancy in BSS transition candidates and neighbor report is detected as an anomaly, in other examples, other deviations in management traffic exchanged between the sensor and the source/target APs may be detected as an anomaly.

In response to detecting the anomaly, at block 212, the wireless roam may be re-initiated for the sensor from the source to the target AP. The re-initiation of the wireless roam refers to initiating a roam for the sensor from the same source to the same target AP as performed at block 202. Re-initiating the roam for the sensor allows to recreate similar management traffic exchange between the sensor and the source/target APs thereby recreating the network conditions during which the anomaly was detected at block 210.

At block 214, management traffic capture is initiated on the sensor. In an example, the computing system may cause the sensor to intercept and log the management traffic that is exchanged between the sensor and the source/target AP. In an example, capturing the management traffic refers to the process of intercepting management frames and logging time, power level, and data rates of the management frames. The sensor may intercept the management traffic in its own operating channel.

Further, in an example, management traffic capture may be initiated on a set of neighboring sensors of the sensor that roams. The set of neighboring sensors may include sensors within a predefined geographical area from the sensor that roams and those belong to the same ESS. At block 216, a first sensor from the set of neighboring sensors may be configured to capture management traffic on a first WLAN channel on which the source AP is operating. A WLAN channel refers to a subdivision of a frequency band in radio frequency (RF) spectrum of a wireless medium used for wireless communication. An AP or non-AP STA may be tuned to operate in a particular WLAN channel at one time. Once the first sensor is tuned to operate on the first WLAN channel, it may communicate with APs operating in the same channel. Thus, the first sensor may intercept and log management traffic exchanged between the source AP operating in the first WLAN channel and the sensor for which roaming is initiated. Since, an additional sensor other than the sensor which is roaming is used for management traffic capture in the first WLAN channel, management traffic to/from the source AP may be captured in a comprehensive manner even after the sensor roams away from the source AP during the re-initiated roam. This allows to have a clearer view of the management traffic originating from the source AP and thereby helps in a complete analysis of the management traffic for roaming issue identification. The packet captures from different neighboring sensors may be merged, collated, processed, and analyzed to obtain a comprehensive view of the management traffic exchanged during the wireless roam.

Likewise, at block 218, a second sensor from the set of neighboring sensors may be configured to capture management traffic on a second WLAN channel on which the target AP is operating. Once the second sensor is tuned to operate on the second WLAN channel, it may communicate with APs operating in the same channel. Thus, the second sensor may intercept and log management traffic exchanged between the target AP operating in the second WLAN channel and the sensor for which roaming is initiated. Since, an additional sensor other than the sensor which is roaming is used for management traffic capture in the second WLAN channel, management traffic to/from the target AP may be captured in a comprehensive manner even before the sensor transitions or re-associates with the target AP. This allows to have a clearer view of the management traffic originating from the target AP and thereby helps in a complete analysis of the management traffic for roaming issue identification.

Further, it may be noted that management traffic capture in the set of neighbor sensors, i.e., the first sensor and the second sensor in the first and second WLAN channels, is not initiated unless an anomaly in the management traffic is detected at block 210. That is, management traffic is not captured throughout the duration of the wireless roam. This conditional capture of management traffic in the neighboring sensors may allow selective execution of traffic capture appliances at the neighboring sensors, thereby optimally utilizing processing and memory resource for analysis and storage of the captured management traffic.

At block 220, a set of Key Performance Indicators (KPIs) of network performance may be determined from the management traffic exchanged over a time interval from reinitiating the roam to a successful transition of the sensor to the target AP. The KPIs may refer to a set of metrics indicative of network performance during roaming of the sensor from the source to the target AP. The KPIs may include client roam times, roam type viz. 802.11r-Fast BSS Transition, and network management statistics like 802.11k Radio Resource Management/802.11v-BSS Transition Management (BTM) information, etc.

At block 222, the computing system may identify the roaming issue based on the set of KPIs and a network performance baseline. In an example, the network performance baseline may include a set of metrics used in network performance monitoring to define the normal working conditions of an enterprise network infrastructure during roaming. In an example, the set of KPIs may be illustrated using a scatter plot which may be compared with the network performance baseline. In some examples, a network administrator may use different analytics and graphing techniques to obtain a graphical representation of the KPIs vis-a-vis the network performance baseline. Deviations between the set of KPIs and the network performance baseline may indicate occurrence of a roaming issue.

Once a roaming issue is identified, the computing system may report the roaming issue via a dashboard, at block 224. In an example, the dashboard may represent a front-end interface of the computing system. In some examples, the computing system may also send a notification to the network administrator in case the roaming issue is identified. Also, in some examples, the computing system may recommend, via the notification, a corrective action to resolve the roaming issue.

Figure 3:
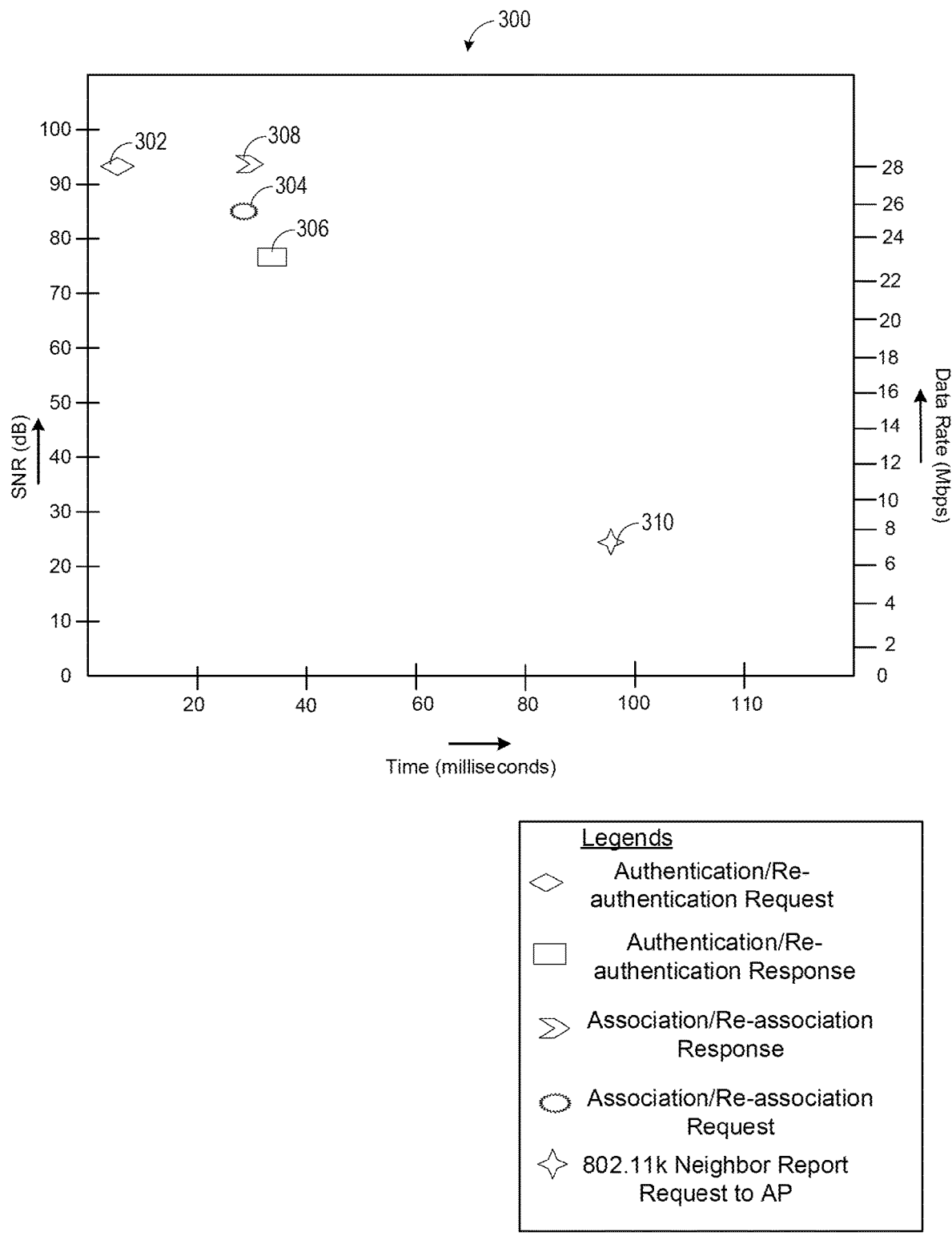
FIG. 3 is an example graphical representation of captured management traffic during identification of roaming issues in a network.

FIG. 3 illustrates a graphical representation 300 of the captured management traffic, according to an example. In an example, a dashboard (front-end of the computing system) may include a roaming tab which may be invoked by the user to display the graphical representation 300. In an example, the graphical representation 300 may be obtained by merging and plotting the management traffic captured while execution of the method 200.

The captured management traffic may be plotted in a scatter plot as shown in the graphical representation 300 of FIG. 3. On reinitiating a roam of the sensor in response to detecting an anomaly in the management traffic, the computing system may initiate a management traffic capture at the sensor roaming from one AP to another and at the set of neighboring sensors. The captured management traffic may be plotted and displayed in the dashboard. In an example, the captured management traffic may include neighbor requests/report pairs exchanged between the sensor and the source AP, BTM response from the sensor to the source AP, reauthentication and reassociation messages exchanged between the sensor and the target AP, security related messages and 4-way handshake messages exchanged between the sensor and the target AP. One or more types of management traffic may be displayed in the graphical representation 300 based on user selection.

In example, both the primary vertical axis (SNR) and the secondary vertical axis (data rate) always remain visible on the graph and the packet display along the corresponding axis depends on the user selection. The horizontal axis represents time in milliseconds. In an example, the graphical representation 300 may display management frames associated with IEEE 802.11v Wireless Network Management (WNM) standards, 802.11k Radio Resource Measurement (RRM) standards, or IEEE 802.1x network access control standards exchanged during the re-initiated roam of the sensor. One or more of the above management frame exchanges may be chosen by a user to be displayed in the graphical representation.

The graphical representation 300 shows an authentication/re-authentication request 302, association/re-association request 304, authentication/re-authentication response 306, association/re-association response 308, and an 802.11k neighbor report request 310. The SNR, data rate, and timing of these messages may be derived from the graphical representation 300. As can be seen from the graphical representation 300, when the sensor sends the 802.11k neighbor report request to the source AP, the source AP does not respond. This absence of response to a management frame may indicate a roaming issue. In an example, the computing system may send a notification indicating that an IEEE 802.11k protocol related roaming issue is present with the source AP. Similarly, any management frame retries may also indicate roaming issues.

Figure 4:
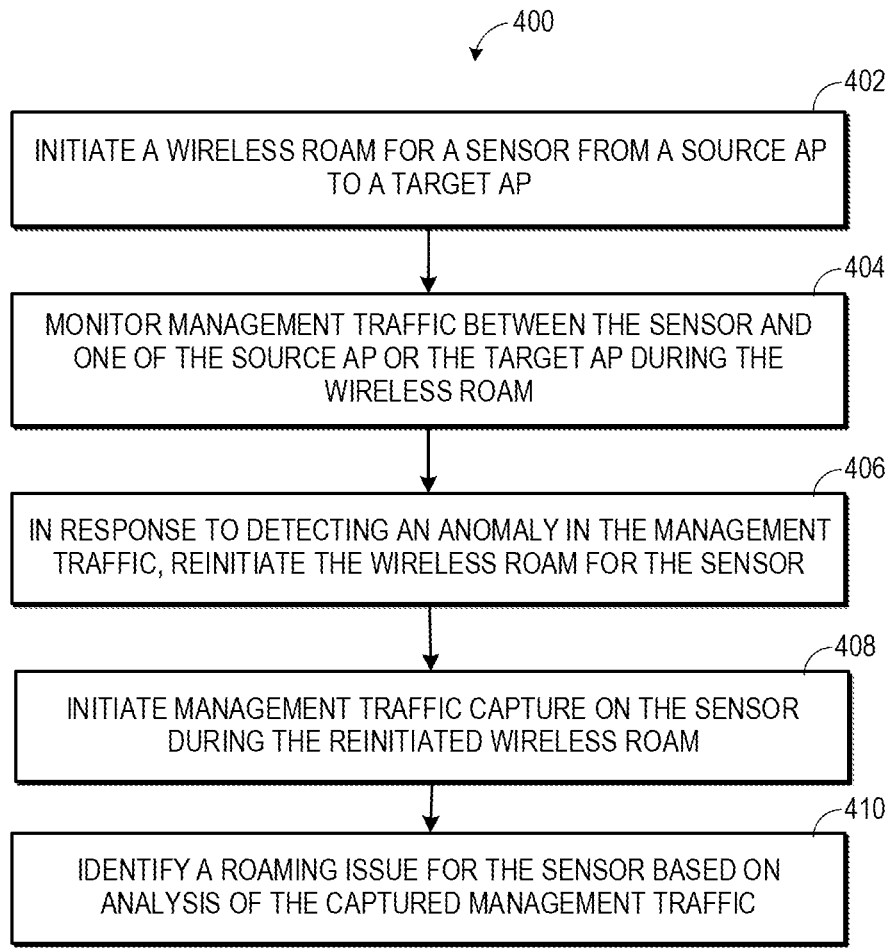
FIG. 4 is a flowchart of an example method for identification of roaming issues in a network.

FIG. 4 is a flowchart of a method 400 for identification of roaming issues, according to an example. In an example, the steps of method 400 may be performed by a computing system, such as the computing system 104 of FIG. 1. At block 402, a wireless roam may be initiated for a sensor from a source AP to a target AP. The source AP and the target AP belong to the same ESS. Initiating wireless roam may include triggering management traffic exchange between the sensor, the source AP and the target AP for transition of the sensor from the source to the target AP. In an example, initiating the roam may include triggering the sensor to lower its transmit power below a predefined threshold. In response to the sensor receiving a Basic Service Set (BSS) transition management (BTM) request from the source AP, the sensor may be caused to send a BTM response to the source AP accepting a transition to the target AP. The BTM request may include a list of BSS transition candidates including the target AP.

At block 404, management traffic between the sensor and one of the source AP or the target AP is monitored during the wireless roam. Management traffic may refer to data exchanged during roaming between a Wi-Fi client and a source AP and/or target AP between which it roams. The management traffic may include neighbor devices information, security information, and association/disassociation information. In an example, monitoring management traffic comprises monitoring at least one of traffic loss, latency, roam time, and AP capabilities, during the wireless roam.

At block 406, in response to detecting an anomaly in the management traffic, the wireless roam for the sensor from the source AP to the target AP is re-initiated. Re-initiating the wireless roam includes restarting the management traffic exchange for roaming. Re-initiating the wireless roam recreates the network conditions of roaming of the sensor during which the anomaly was detected. In an example, the anomaly in the management traffic comprises non-receipt of a response to a neighbor report request sent by the sensor to the source AP.

At block 408, management traffic capture may be initiated on the sensor during the reinitiated wireless roam. The management traffic exchanged between the sensor and the source or target AP may be captured by the sensor. In another example, initiating the management traffic capture comprises configuring a first sensor from a set of neighboring sensors to capture management traffic on a first WLAN channel on which the source AP is operating. In another example, initiating the management traffic capture comprises configuring a second sensor from the set to capture management traffic on a second WLAN channel on which the target AP is operating.

At block 410, a roaming issue for the sensor may be identified based on analysis of the captured management traffic. In an example, a set of KPIs of network performance may be determined from the management traffic exchanged over a time interval from reinitiating the simulation of the wireless roam to a successful transition of the sensor to the target AP. The roaming issue may be identified based on the set of KPIs and a network performance baseline. Further, the roaming issue may be reported by displaying a notification indicating the roaming issue on a dashboard.

Figure 5:
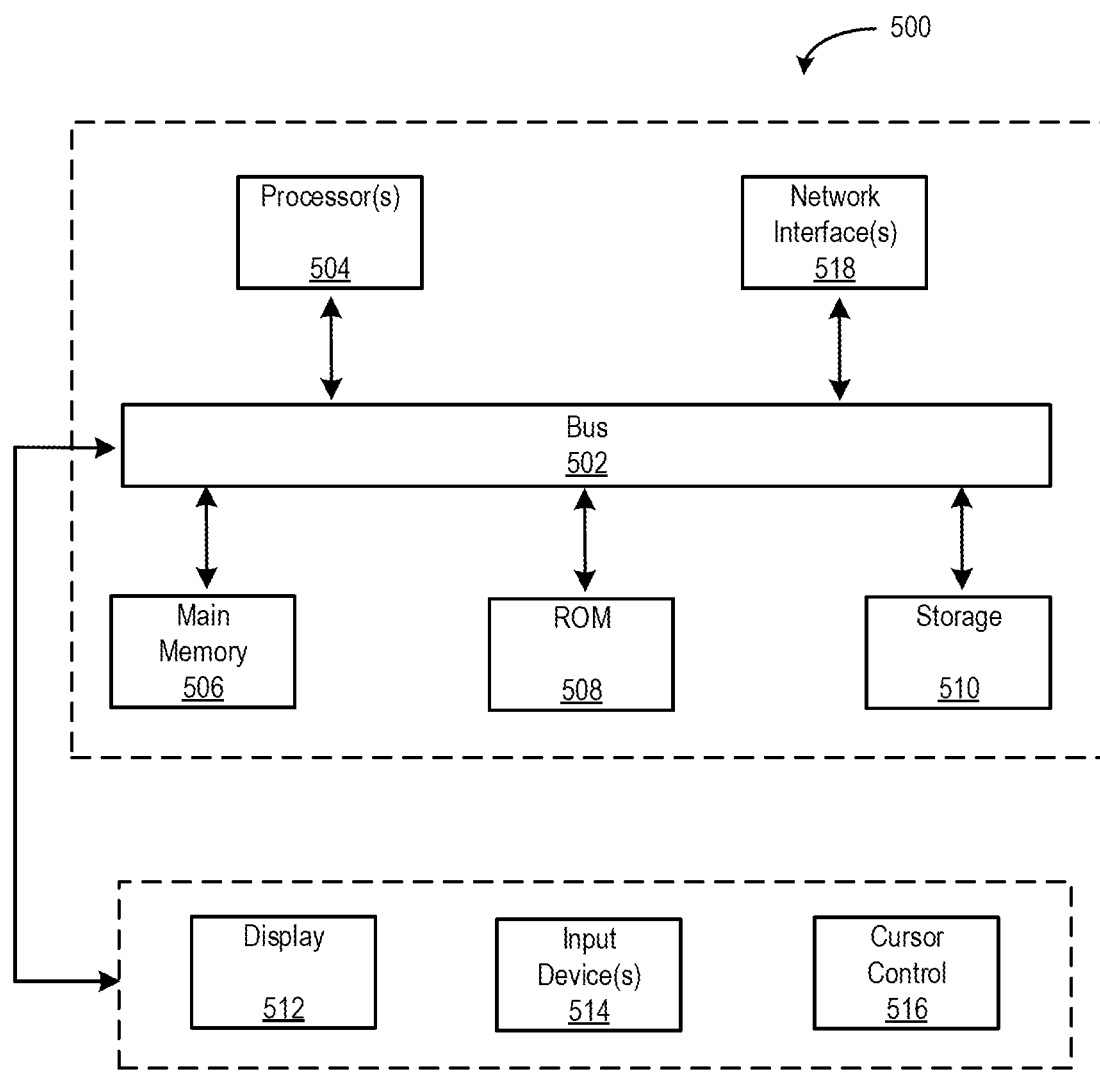
FIG. 5 depicts a block diagram of an example computing system in which various of the examples described herein may be implemented.

FIG. 5 depicts a block diagram of an example computer system 500 in which the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the network interface 518. The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process steps may be omitted in some implementations. The methods and processes described herein are also not limited to any particular sequence, and the steps or states relating thereto can be performed in other sequences that are appropriate, or may be performed in parallel, or in some other manner. Steps or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present invention have been described in language specific to structural features and/or methods, it is to be noted that the present invention is not necessarily limited to the specific features or methods described. Rather, the specific features and methods are disclosed and explained in the context of a few implementations for the present invention.

The invention claimed is:

1. A method comprising:
   initiating, by a computing system, a wireless roam for a sensor from a source AP to a target AP by:
      triggering the sensor to lower its transmit power below a threshold; and
      in response to the sensor receiving a Basic Service Set (BSS) transition management (BTM) request from the source AP, wherein the BTM request comprises a list of BSS transition candidates including the target AP, causing the sensor to send a BTM response to the source AP accepting a transition to the target AP;
   monitoring, by the computing system, management traffic between the sensor and one of the source AP or the target AP during the wireless roam;
   in response to detecting an anomaly in the management traffic, reinitiating, by the computing system, the wireless roam for the sensor from the source AP to the target AP;
   initiating, by the computing system, management traffic capture on the sensor during the reinitiated wireless roam; and identifying, by the computing system, a roaming issue for the sensor based on analysis of the captured management traffic; and reporting, by the computing system, the roaming issue.

2. The method of claim 1, wherein detecting the anomaly in the management traffic comprises:

monitoring a set of neighbor reports sent by the sensor to the source AP; and in response to the sensor receiving the BTM request during the wireless roam, verifying whether the list of BSS transition candidates in the BTM request is obtained based on the set of neighbor reports.

3. The method of claim 1, wherein the anomaly in the management traffic comprises non-receipt of a response to a neighbor report request sent by the sensor to the source AP.

4. The method of claim 3, further comprising initiating management traffic capture at a set of neighboring sensors in response to detecting the anomaly, wherein initiating the management traffic capture at the set of neighboring sensors comprises:

configuring a first sensor from the set to capture management traffic on a first WLAN channel on which the source AP is operating; and configuring a second sensor from the set to capture management traffic on a second WLAN channel on which the target AP is operating.

5. The method of claim 1, wherein monitoring management traffic comprises monitoring at least one of traffic loss, latency, roam time, and AP capabilities, during the wireless roam.

6. The method of claim 1, wherein identifying the roaming issue comprises:

determining a set of Key Performance Indicators (KPIs) of network performance from the captured management traffic; and identifying the roaming issue based on the set of KPIs and a network performance baseline.

7. The method of claim 1, wherein the source AP, the target AP, the sensor, and the set of neighboring sensors are included in a single Extended Service Set (ESS).

8. The method of claim 1, wherein reporting the roaming issue comprises displaying a notification indicating the roaming issue on a dashboard coupled to the computing system.

9. A computing system comprising:

a processor; and a memory coupled to the processor, the memory storing instructions executable by the processor to:

initiate a wireless roam for a sensor from a source AP to a target AP by:

triggering the sensor to lower its transmit power below a threshold; and in response to the sensor receiving a Basic Service Set (BSS) transition management (BTM) request from the source AP, wherein the BTM request comprises a list of BSS transition candidates including the target AP, cause the sensor to send a BTM response to the source AP accepting a transition to the target AP;

monitor management traffic between the sensor and one of the source AP or the target AP during the wireless roam;

in response to detecting an anomaly in the management traffic, reinitiate the wireless roam for the sensor from the source AP to the target AP;

initiate management traffic capture on the sensor during the reinitiated wireless roam;

identify a roaming issue for the sensor based on analysis of the captured management traffic; and report the roaming issue.

10. The computing system of claim 9, wherein to detect the anomaly in the management traffic, the processor is to:

monitor a set of neighbor reports sent by the sensor to the source AP; and in response to the sensor receiving the BTM request during the wireless roam, verify whether the list of BSS transition candidates in the BTM request is obtained based on the set of neighbor reports.

11. The computing system of claim 9, wherein the anomaly in the management traffic comprises non-receipt of a response to a neighbor report request sent by the sensor to the source AP.

12. The computing system of claim 9, wherein the processor is further to initiate management traffic capture at a set of neighboring sensors in response to detecting the anomaly, wherein to initiate the management traffic capture at the set of neighboring sensors the processor is to:

configure a first sensor from the set to capture management traffic on a first WLAN channel on which the source AP is operating; and configure a second sensor from the set to capture management traffic on a second WLAN channel on which the target AP is operating.

13. The computing system of claim 9, wherein to monitor management traffic, the processor is to monitor at least one of traffic loss, latency, roam time, and AP capabilities, during the wireless roam.

14. The computing system of claim 9, wherein to identify the roaming issue the processor is to:

determine a set of Key Performance Indicators (KPIs) of network performance from the captured management traffic; and identify the roaming issue based on the set of KPIs and a network performance baseline.

15. The computing system of claim 9, wherein the source AP, the target AP, the sensor, and the set of neighboring sensors are included in a single Extended Service Set (ESS).

16. The computing system of claim 9, wherein to report the roaming issue the processor is to display a notification indicating the roaming issue on a dashboard coupled to the computing system.

17. A non-transitory, computer readable medium including instructions that, when executed by a processor, cause a computing system to:

initiate a wireless roam for a sensor from a source AP to a target AP by:

triggering the sensor to lower its transmit power below a threshold; and in response to the sensor receiving a Basic Service Set (BSS) transition management (BTM) request from the source AP, wherein the BTM request comprises a list of BSS transition candidates including the target AP, cause the sensor to send a BTM response to the source AP accepting a transition to the target AP;

monitor management traffic between the sensor and one of the source AP or the target AP during the wireless roam;

in response to detecting an anomaly in the management traffic, reinitiate the wireless roam for the sensor from the source AP to the target AP;

initiate management traffic capture on the sensor during the reinitiated wireless roam;

identify a roaming issue for the sensor based on analysis of the captured management traffic; and
report the roaming issue.

* * * * *